United States Patent [19]
Baxter

[11] Patent Number: 5,805,054
[45] Date of Patent: Sep. 8, 1998

[54] AUTOMOBILE THEFT PREVENTION AND PROTECTION DEVICE

[76] Inventor: Merrill Baxter, Mariners Harbor Station, 2980 Richmond Ter., Staten Island, N.Y. 10303

[21] Appl. No.: 63,019

[22] Filed: May 17, 1993

[51] Int. Cl.⁶ .................................................. B60R 25/10
[52] U.S. Cl. ...................... 340/426; 340/425.5; 340/542; 340/430; 307/10.3
[58] Field of Search ................................ 340/425.5, 542, 340/543, 10.3; 307/10.4, 10.5, 430

[56] References Cited

U.S. PATENT DOCUMENTS

| | | | |
|---|---|---|---|
| 3,544,804 | 12/1970 | Gaumer et al. | 307/10.4 |
| 4,000,409 | 12/1976 | Graziosi | 307/10.4 |
| 4,420,794 | 12/1983 | Anderson | 307/10.5 |
| 4,463,340 | 7/1984 | Adkins et al. | 307/10.4 |
| 5,023,591 | 6/1991 | Edwards | 340/426 |
| 5,218,338 | 6/1993 | Chang | 307/10.4 |
| 5,481,253 | 1/1996 | Phelan et al. | 307/10.4 |

Primary Examiner—Jeffery A. Hofsass
Assistant Examiner—Daryl C. Pope

[57] ABSTRACT

An automobile theft prevention system including a bistable switching device that receives a voltage input, delivers and controls a voltage output to drive an essential electrical circuit in the engine electrical system of an automobile. The system has circuitry coupled with the switches of the standard door switch circuit installed on automobiles associated with interior lighting. When a door is opened, circuitry of the system will be actuated thereby, to sequentially activate visible alarm devices, electrically shut down the engine and activate audible alarms. Entering a coded signal before opening a door prevents shutting down of the engine. When the engine shuts down by opening a door or by depressing a panic button on a code impulse device, it requires the entry of a coded signal to be restarted, as well as to turn off the visible and audible alarms. When the engine is turned off manually through the ignition key, the user may enter a code to program it to be restarted through the system or to bypass the system for direct start up. The system is continuously in the armed position whether the engine is running or in a state or rest but, the shut down function may be programmed to be active or inactive for any given period of time.

14 Claims, 7 Drawing Sheets

AUTOMOBILE THEFT PREVENTION AND PROTECTION DEVICE

REFERENCES CITED

U.S. Patent Documents

U.S. Pat No. 2,517,619, Aug. 8, 1950, Ainsley
U.S. Pat. No. 3,004,170, Oct. 10, 1961, Greenspan
U.S. Pat. No. 3,174,502, Mar. 23, 1965, Howarth et al.
U.S. Pat. No. 3,343,625, Sep. 26, 1967, Scheuermann
U.S. Pat. No. 3,419,729, Dec. 31, 1968, Hall
U.S. Pat. No 3,544,804, Dec. 16, 1968, Gaumer et al.
U.S. Pat. No. 3,656,102, Apr. 11, 1972, Hale et.al.
U.S. Pat. No. 4,000,409, Dec. 28, 1976, Graziosi
U.S. Pat. No. 4,420,794, Dec. 13, 1983, Anderson
U.S. Pat. No. 5,023,591, Jun. 11, 1991, Edwards

BACKGROUND OF THE INVENTION

1. Field of the Invention

The present invention relates generally to theft prevention apparatus for deterring theft or unauthorized use of a motor vehicle and, more particularly, to apparatus which will on command or automatically cause the immobilizing of a running vehicle when illicitly operated.

2. Description of the Prior Art

Heretofore, various apparatus have been contrived to deter or prevent the theft of parked unattended motor vehicles, by means of sounding an alarm to alert attention when different type sensors are activated due to unauthorized interference, as well as, in several such contrivances, rendering the engine of the vehicle incapable of being started, chiefly by interrupting or shorting one or several of the vehicle engine's electrical circuits and, in which the closing of cooperative elements must be achieved in order to complete an operative circuit, as described in U.S. Pat. Nos. 2,517,619; 3,004,170; 3,174,502; 3,343,625; 3,419,729; 3,544,804; 3,656,102; and 4,000,409.

More recent development in the prior art employs digital electronic circuitry along the same theft preventive principle described above, wherein digital coded signals are transmitted by an entry device, to a central processing unit, or central control unit, which is actuated to initiate the desired effect. Typical of this is U.S. Pat. Nos. 4,420,794 and 5,023,591.

However, such apparatus fall short of being able to effectively deter or prevent the theft of a vehicle with running engine, or the forceful taking of a vehicle in motion, referred to as hijacking.

This new crime pattern has exacted from the art greater creativity and innovation to effectively deal with this new trend.

SUMMARY OF THE INVENTION

The present proposal, therefore, is for an Automobile Antitheft System incorporating a removable code transmitting device referred hereto as a keypad located in the dashboard area of the vehicle, and a master control box referred hereto as a module located in the engine compartment, which is secured by an electrical lock, all interconnected by a multiconductor cable.

A coded signal from the keypad causes electronic components in the master control module, which act as blockers to the path of electricity in a vehicle's electrical or electronic system, to conduct current permitting start-up of the engine, or conversely, to switch off conducting, on a time elapsed basis, after an appropriate manual signal from the keypad or other indirect actuating means is given, thereby causing shutdown of the vehicle, and simultaneous activation of alarm devices and visual apparatus.

A system having a coded feature whereby a code entered through the keypad, sets the mode for all subsequent engine start up without entering the preset code, and when started without the preset code, sets the mode for entering the preset code for all subsequent start up in order to guard against the necessary divulging of the start up code, in circumstances where operation of the vehicle is to be handed over to a third party.

A system geared towards protecting the physical well-being of the victim, from violent acts of a disappointed perpetrator while at same time aborting theft of the vehicle, and ensuring immediate recovery.

Also, a main object of this invention is to execute such anti-hijacking means in a manner that affords the victim a reasonable chance to escape physical harm during such attempt.

Yet another object of this invention is to provide a disabling means in its simplest form, but with greatest efficacy in the intended application, and capable of being easily installed and tamper proof. In connection with the latter, the hood of the engine compartment is fitted with an electronically controlled lock preventing it from being readily opened except when code enabled by the said keypad.

Several other important and desirable objects and features will become apparent from the following description of a theft protection apparatus embodying the invention in a preferred form, and the drawings associated therewith.

BRIEF DESCRIPTION OF THE DRAWINGS

As can be seen.

DETAILED DESCRIPTION OF THE PREFERRED EMBODIMENT

Figure 1:
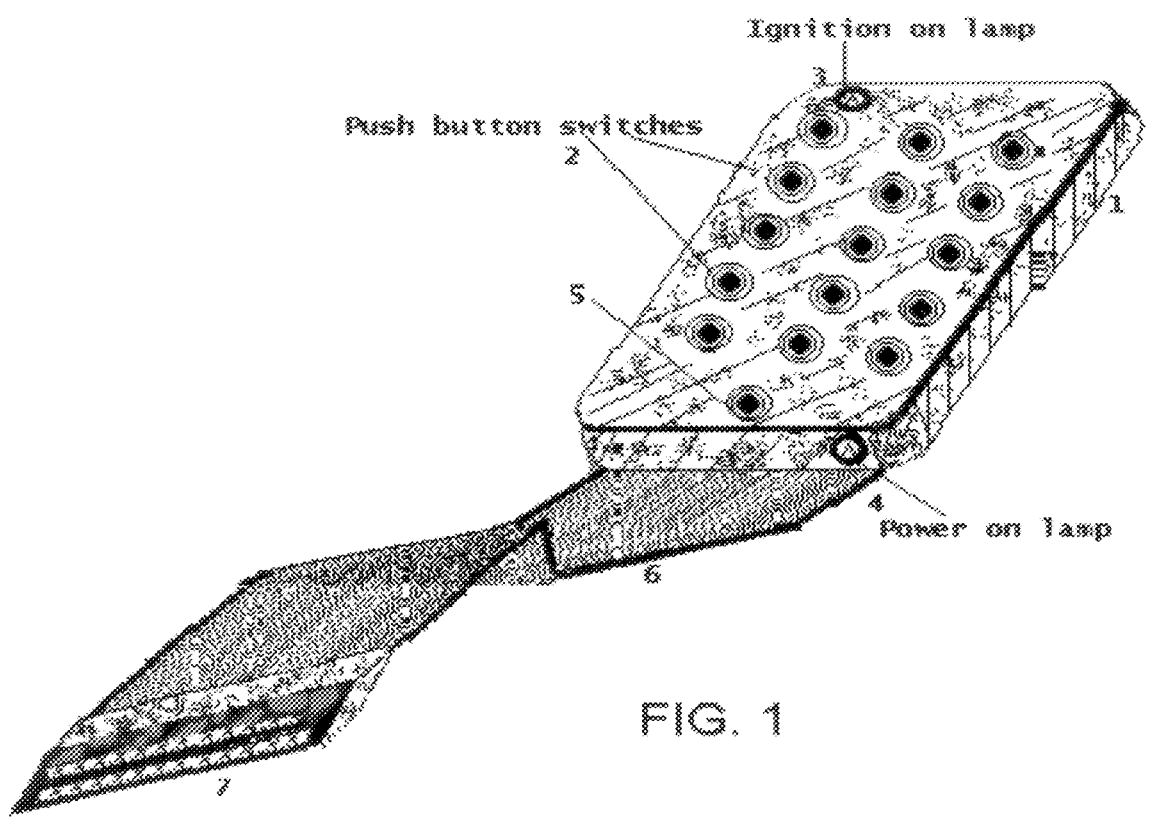
FIG. 1 is a diagrammatic view of a push button actuator, with ribbon cable and female connector.

Referring to FIG. 1, the dimensions of the keypad enclosure, FIG. 1—1, is approximately $7/8" \times 2 3/8" \times 4 1/2"$ with a tapered short end, but may be any suitable size and shape. On one of its larger sides is mounted sixteen mini momentary contact switches, commonly referred to as push button switches, FIG. 1–2. Also, on the same side a light emitting diode, FIG. 1 3, is positioned in the upper right hand corner and turns on to indicate that the system is in the operating mode.

Another light emitting diode, FIG. 1–4, is mounted on one of the shorter sides of the enclosure and glows to indicate that power is turned on by the ignition switch.

From this same side a flat multiconductor cable of the type used in the computer industry and commonly referred to as ribbon cable, FIG. 1–6, enters the enclosure of the keypad its several conductors being internally connected to the push button switches, as well as two audio indicators—mini buzzers—which are mounted therein. The other end of the cable is terminated in one half of a ribbon cable connector FIG. 1–7.

FIG. 1–5, shows the push button switch that is used to manually trigger engine shut down and emergency alert systems, during a hijack attempt, which will be described in subsequent paragraphs.

Figure 2:
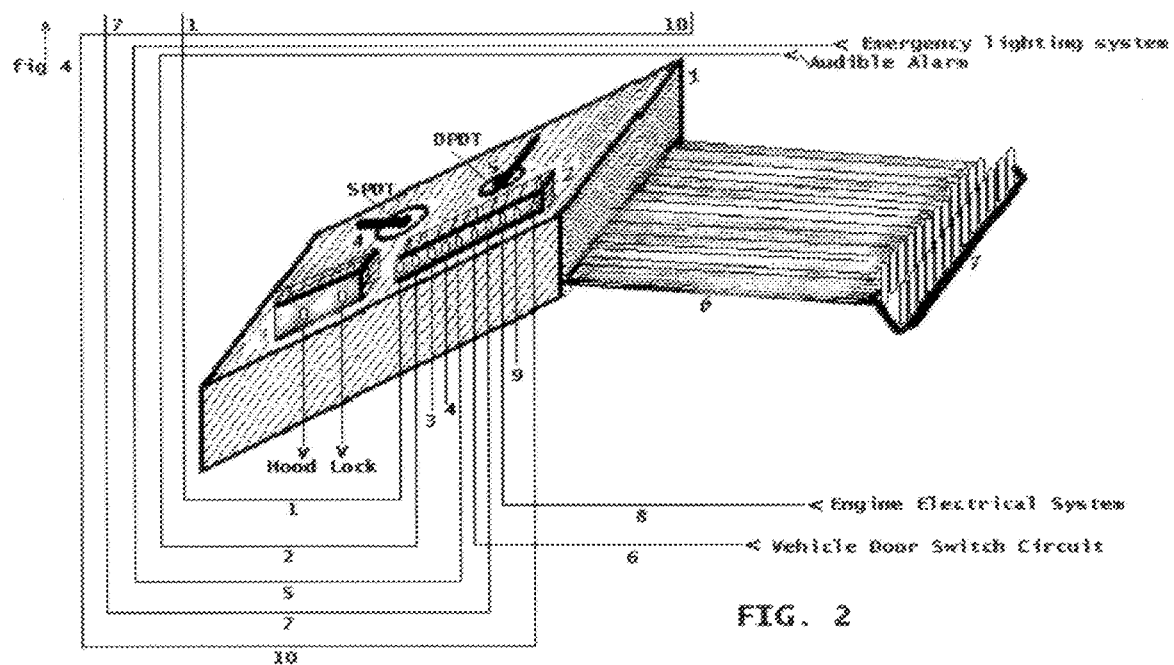
FIG. 2 is a diagrammatic view of an enclosure having terminal connectors and switches mounted thereon, with ribbon cable and male connector.

The master control enclosure shown in FIG. 2, provides housing and support for the electronic and electrical circuits and, is about 6"×3 3/16"×1 7/8" but may be any desirable size or shape, FIG. 2–1. One of its sides is a removable cover held in place by a screw in each of its corners. On this cover is mounted two connector blocks, a ten terminal block FIG. 2—2 and a two terminal block FIG. 2–3. These connector blocks are for the purpose of connecting the power supply, sound alarm, emergency light flashing system, and sensor devices to be controlled by the theft prevention system.

Also mounted on the cover of the enclosure are two toggle switches. Single Pole Double Throw Switch (SPDT), FIG. 2–4, interconnected with Double Pole Double Throw Switch (DPDT) FIG. 2–5, together provide for the selection of four different code combinations with respect to the starting of the vehicle's engine by means of the keypad FIG. 1—1. Two of the four combinations are changed by one number only from a selected group of numbers between one and fifteen preprogrammed into the codes. Although this may appear to be a rather small change, its effectiveness will become apparent when the several functional aspects of the keypad are subsequently described. Eliminating the DPDT switch FIG. 2–5 reduces to two the number of combinations from which to choose. similarly the use of a multi-position rotary switch as well as repetition of SCR circuits shown in FIG. 3C would increase the number of combinations if so desired.

A multiconductor ribbon cable enters the enclosure from one of its sides FIG. 2–6, which may be any convenient side. Its several conductors are connected internally to the system's functional electronic circuit boards. The multiconductor ribbon cable may contain any number of conductors, determined only by a trade off between cost and wiring design requirement. FIG. 2–7 shows the other end of the ribbon cable terminating in the opposite half of the cable connector mentioned in FIG. 1–7. The two halves of the connector are inserted one into the other to complete the system.

FIG. 3, is a wiring schematic of the keypad and the electronic subassembly boards contained in the control module which together make up the entire control processor of the antitheft system. A legend of symbols used in the drawing is shown in FIG. 3B.

Figure 3A:
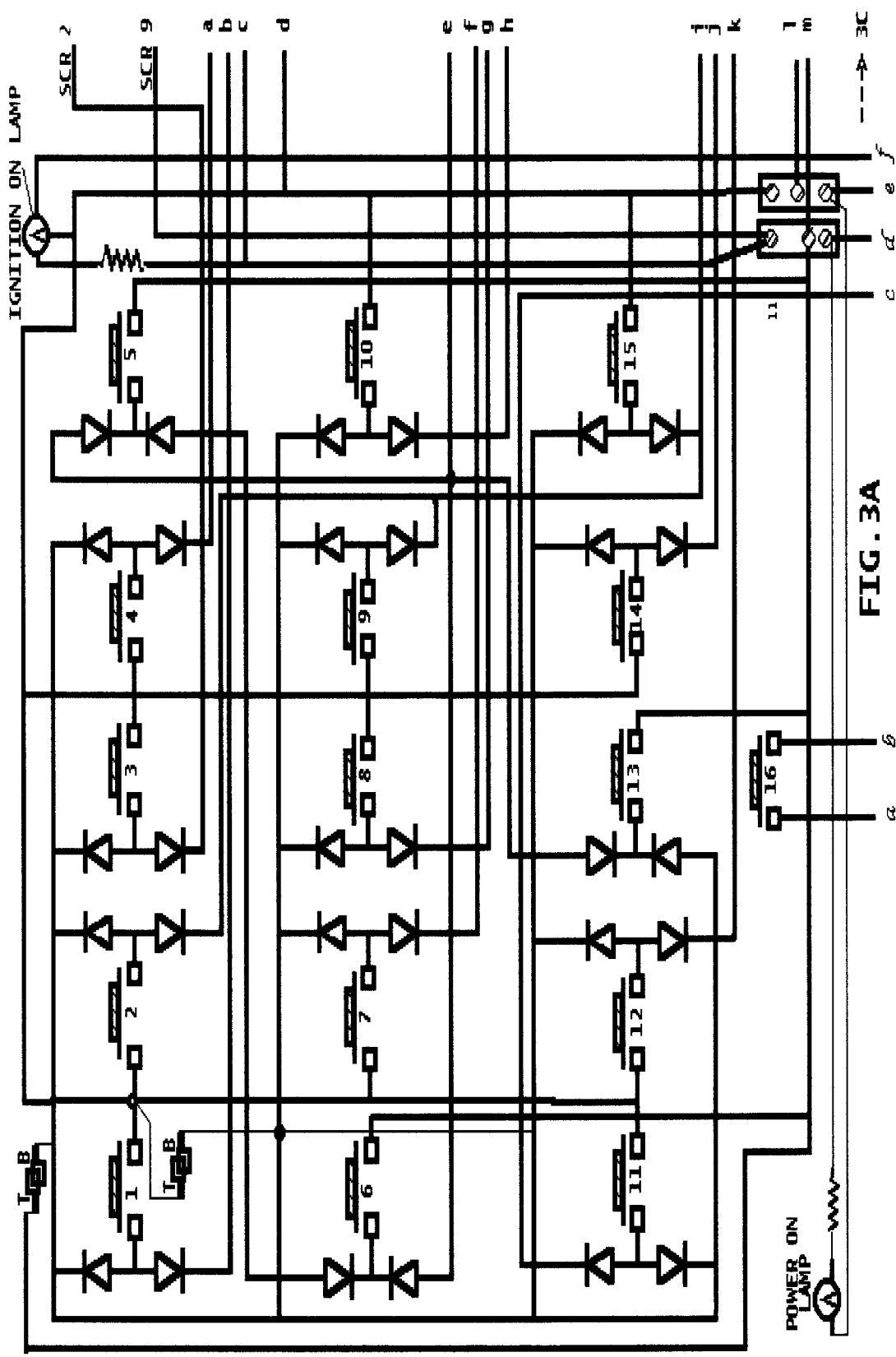
FIG. 3A, is a schematic of the keypad wiring.

Of the sixteen push button switches mounted on the keypad, fifteen of them are divided into two sets, one set containing eleven switches, FIG. 3A, switch Nos. 1 to 15 with the exception of switches 5, 6, 11, and 13 which form the smaller set of four. Both sets are wired in a similar manner with the larger set hooked up to the positive side of the power supply while the smaller four set is hooked to the negative side.

This wiring arrangement of the switches is for the purpose of demonstration only and in no way suggests that every keypad forming part of this system will be so wired. In fact it will be necessary to vary the number arrangement of the switches with respect to the wiring herein mentioned, in order to individualize the code combinations, as mentioned in preceding paragraphs, for each system unit produced.

The keypad wiring in FIG. 3A also shows two audible indicators T.B, (Buzzers) in the upper right corner. It will be seen that the buzzer circuits are completed by means of depressing a push button switch closing its open contacts to sound the buzzer. Their purpose is merely to indicate that the push button is properly pressed and that the contacts had indeed closed to effect the intended function.

One side—the line terminal—of each switch is hooked up to either the positive or negative side of the power supply depending on its assignment. Positive supply to the keypad is taken from the ignition switch which must be in the on position for the keypad circuits to function.

The load terminal of each switch is connected to one of the buzzers by means of a diode in such manner as to permit current to flow to the buzzer, but prevent current flowing back to the switch terminal and into the circuits of the control module through the cable conductors, from the common junction at the buzzers when any one of the other switches is depressed.

The cable conductors to the load terminals of the switches are also connected through a diode to the several SCR'S and Relays that they control, in such manner as to prevent current flowing through the circuits back to the switch terminals and on to the buzzers, causing them to sound continuously.

Push button switch no. 16 of FIG. 3A is used to manually trigger the time elapsed shut down function of the system during a hijack attempt in the case where this is not done automatically by connected door switches. Its terminals are connected, through conductors in the ribbon cable to timer No. 1 in the control module, FIG. 3B, at terminals 1—1 and 1–2.

Figure 3B:
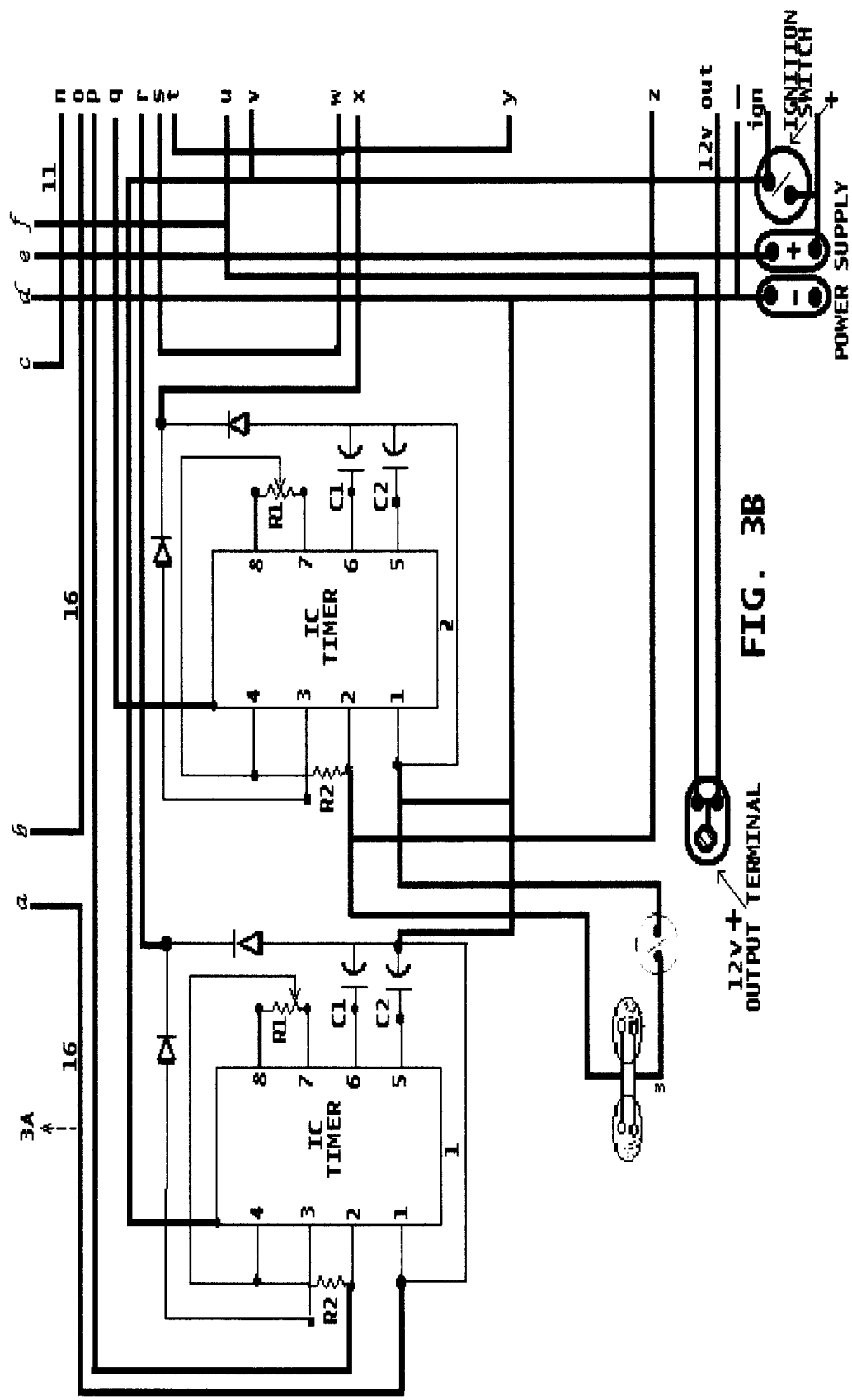
FIG. 3B, is a schematic of the timer circuitry wiring.

FIG. 3B, shows the circuit wiring of the two identical timers which are connected across the power supply with timer 1 being so connected via the ignition switch. The circuit utilizes a standard 555 integrated circuit timer. Momentarily depressing pushbutton switch No. 16 in FIG. 3A, bridges timer terminal (pin) No. 2 to its grounded terminal No. 1 causing it to give a high output equal to that of the line voltage. This output voltage energizes Double Pole Double Throw Relay (DPDT) No. 1 shown in FIG. 3D which is connected thereto.

Varying the value of resistor R1 across timer terminals 7 & 8, varies the length of time the timer circuit maintains its high output. Higher values of R1 or C1 increase this time. Capacitor C2 prevents the timer circuit from being falsely triggered by static charges. Diode D1 is a current blocking diode while D2 bypasses to ground voltage surges due to induction in the relay coil when it is deenergized so as to protect the timer circuit from damage.

The timer circuit is herein explained for clarification of its operation only and does not in any way constitute an individual claim in its design or function, and any reference to a claim in this respect relates only to the method of its incorporation in the invention when claiming the method itself.

Figure 3C:
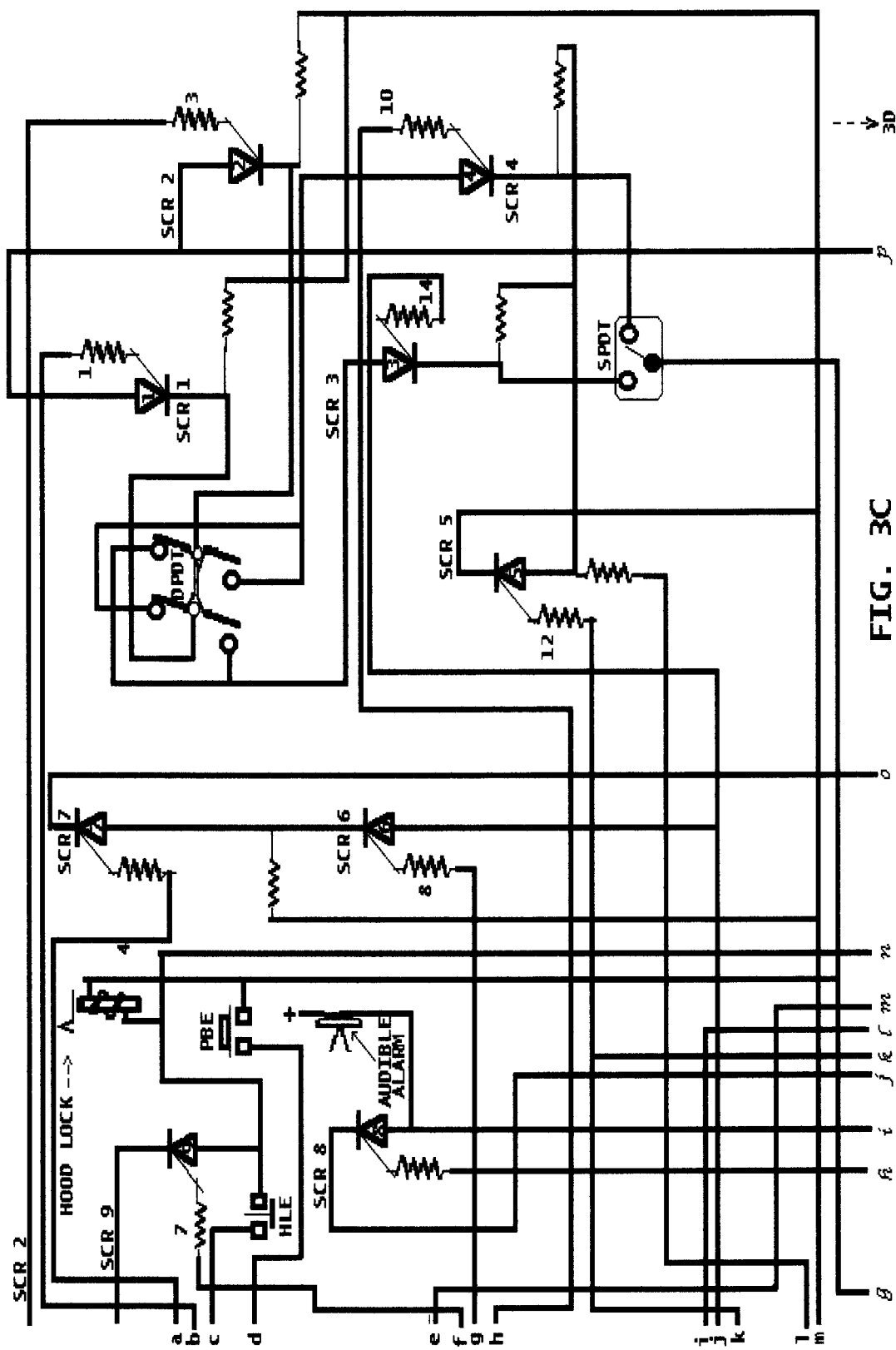
FIG. 3C, is a schematic of the SCR and toggle switch wiring.

FIG. 3C, shows the wiring of the Silicon Controlled Rectifier (SCR) board in the control module. The board has nine SCR'S mounted thereon, represented by the standard symbol for this electronic component, where the short solid line across one point of the shaded triangle or arrowhead is the cathode, and the line of the triangle opposite this point is the anode. For the purpose of explanation they are numbered 1 through 9. SCR'S 1, 2, 3, 4, 5, 6, and 7 in conjunction with the keypad push button switches that trigger their gates, are assigned the combination code function, with 1, 2, 3, and 4 wired in an interchange arrangement through switch DPDT and switch SPDT also shown in FIG. 3C.

The variable interconnection of these four SCR'S provide the four fixed code combinations achieved by, connecting the output of each SCR to a single terminal on the multipole switch, of which the terminals are interconnected in a manner that can be varied by throwing or turning the lever of the switch, thereby effecting a corresponding change in the group of SCR'S that are hooked up in series to drive slave relay DPDT -R5. One of said combinations must be entered through a corresponding group of pushbutton switches on the keypad in order to operate the theft prevention system.

Figure 3D:
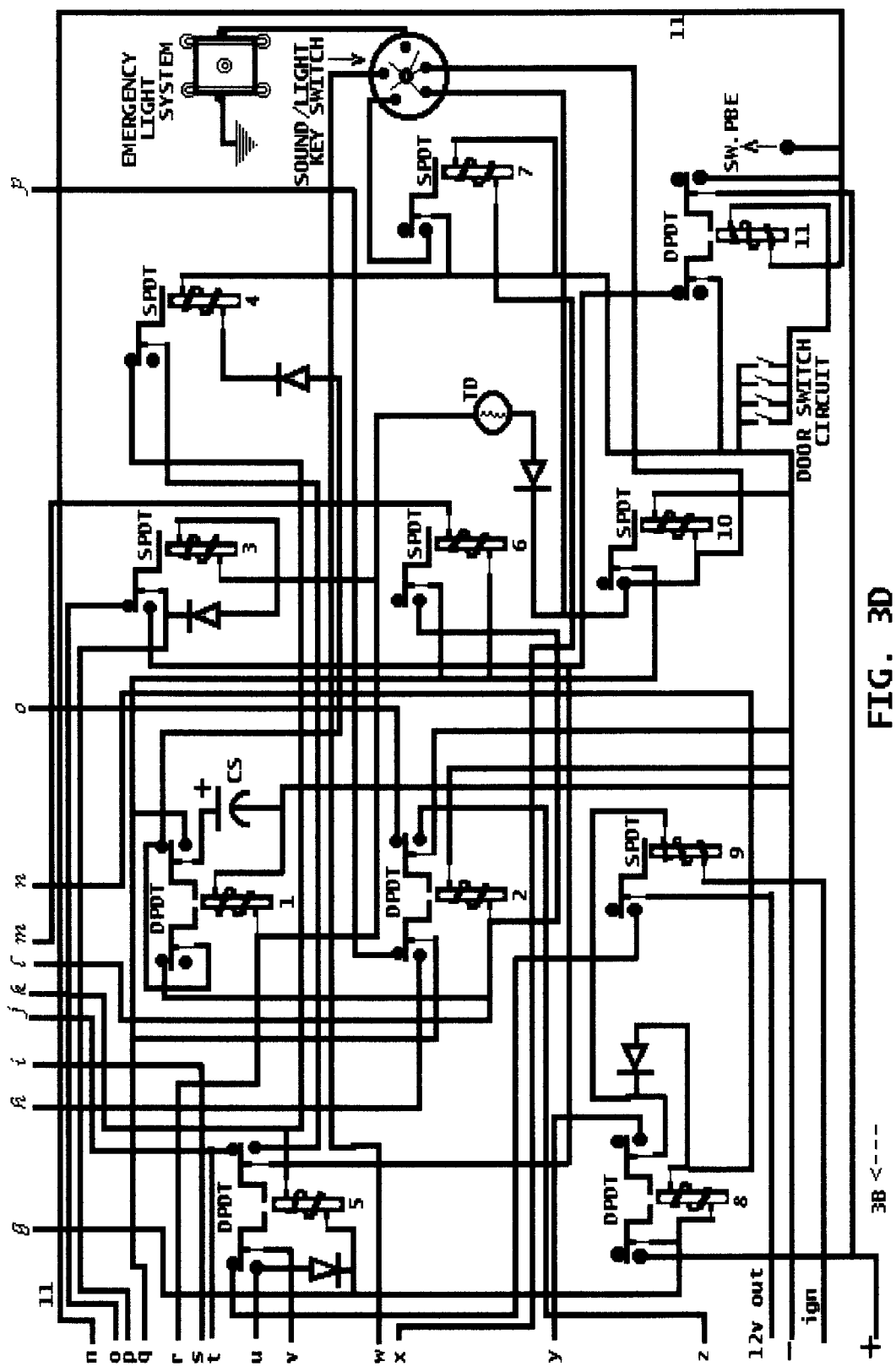
FIG. 3D, is a schematic of the relay circuitry wiring.
Figure 4:
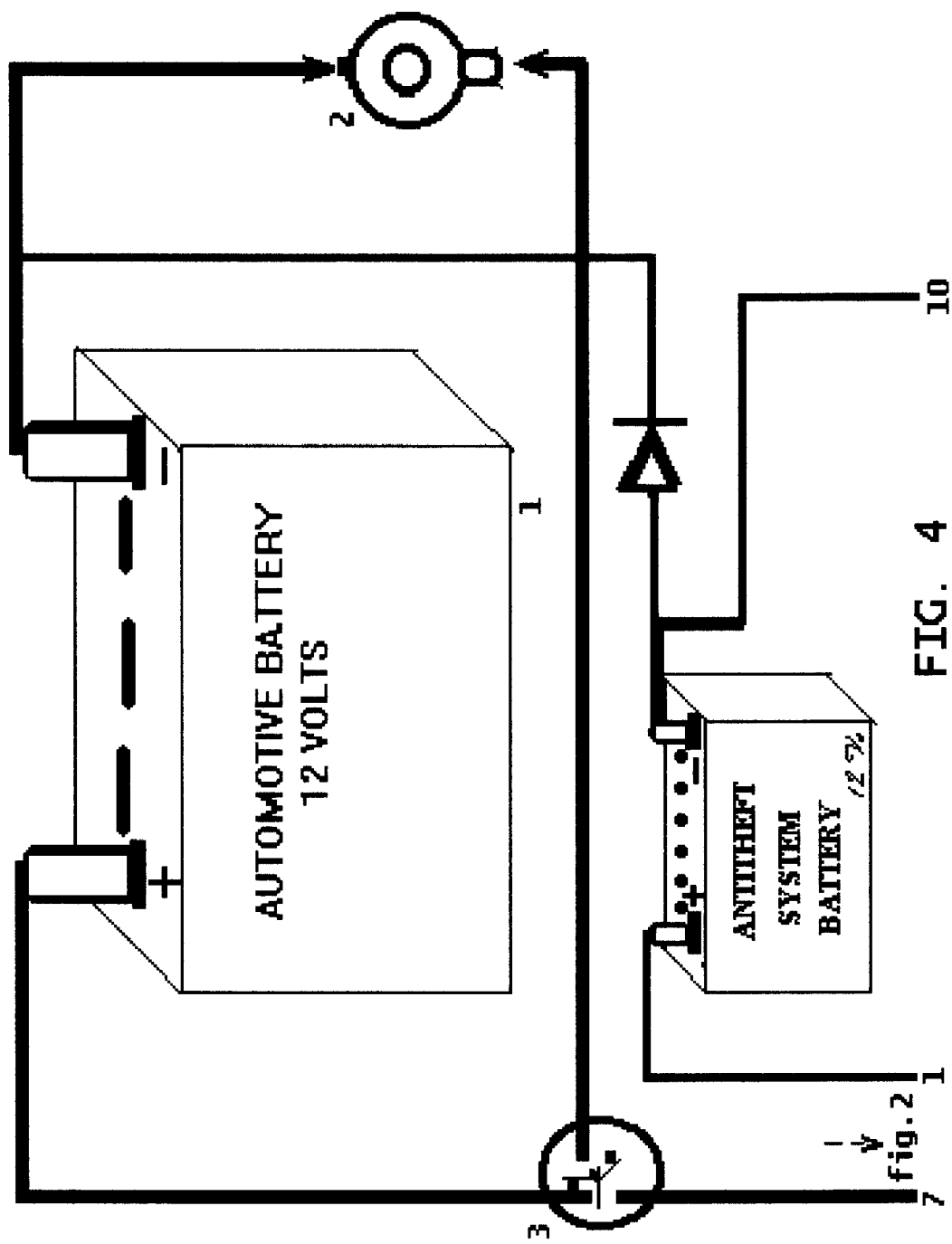
FIG. 4 shows the independent battery of the antitheft apparatus, wired into the charging circuit of a vehicle's service battery.

Referring to FIG. 3C it will be seen that the anode of SCR'S 1 and 2 are connected to the positive side of the power supply, through a pair of closed contacts on relay DPDT - R2, FIG. 3D. In turn the cathode of each one of these two SCR'S is connected to the anode of either SCR 3 or 4 by means of the hook-up arrangement at the DPDT switch as shown in the drawing. The cathodes of 3 and 4 are selectively connected to one side of relay DPDT - R5, FIG. 3D.

The other side of relay R5 is connected to the anode of SCR 6, the cathode of witch is connected to the anode of SCR 7. Finally the cathode of SCR 7 is connected to the negative side of the power supply through another pair of closed contacts on relay DPDT - R2, FIG. 3D.

In order for the SCR'S to conduct a positive voltage pulse must be applied to their gate terminals. (see FIG. 3C–9.) This positive pulse is supplied by depressing the relevant positive biased push button switch on the keypad, that is connected to each SCR gate in FIG. 3A. It is clear that relay R5 will pull in when all SCR'S connected thereto are conducting. Where necessary an individual SCR is held in the conducting state by a resistor connected across its output terminal and the opposite polarity of the power supply. Since the power supply to the SCR'S pass through closed contacts of relay - R2, the pulling in of R2 opening its contacts will interrupt the supply switching off the SCR'S, (consequently de-energizing relay DPDT - R5,) which must again be triggered by the keypad in order to conduct.

SCR 5 is included in the code combination circuitry and prevents premature energizing of relay - R5 with only three of the required minimum of four code numbers to be punched in, due to line return current.

The operation of SCR 8 which controls alarm triggering, and SCR 9 which controls the hood lock will be described in subsequent paragraphs.

FIG. 3, shows a relay circuit board on which is mounted eleven relays. Relays DPDT - R1, DPDT - R2, DPDT - R5 DPDT - R8 and DPDT - R11 are double pole double throw relays, while relays SPDT - R3 through SPDT - R10 with the exception of R8 are single pole double throw relays.

DPDT - R1 is the first in the relay network and is connected across a negative line coming directly from the power supply, and the positive output terminal of timer 1, FIG. 3B pin 3. When the output at this terminal goes high with respect to the negative terminal relay R1 is energized and pulls in changing the position of its contacts.

The negative side of supply capacitor CS is connected to the negative line of the power supply, the positive side is connected to the load side of a pair of positive normally open contacts on relay DPDT - R1. This load contact is bridged to the line side of a pair of normally closed contacts on the same relay R1, FIG. 3C. The load side of these closed contacts is connected to one side of the coils of relay DPDT - R2 and SPDT - R4 while the line side of the open contacts is connected to the positive side of the power supply the other sides of these coils are connected to the negative side of the power supply, FIG. 3D.

When timer 1 is triggered it energizes relay DPDT - R1 causing its normally closed and open contacts to assume the reverse position in which state they are held until the timer output drops off. During this predetermined time capacitor CS charges, and develops a potential across its terminals equal to that of the line voltage. On the dropping out of relay R1 its contacts return to their normal position and capacitor CS discharges through the coils of relay R2 and relay R4 causing them to pull in. R2 switches off SCR'S 1 through 7, and R4 drops out relay R5 by interrupting its holding circuit which passes through R4's closed contacts. The diode in the line between the closed contacts of relay R1 and the coil of relay R2, as well as all other diodes in the coil circuits of the relays are for the purpose of preventing undesirable current return through the relay coils to other points in the circuitry.

Referring to the preceding paragraphs it will be seen that triggering timer 1 will cause the vehicle's engine to shut down, if an essential circuit in its operation is connected to normally open contacts on relay DPDT - R5, referred to as the slave relay.

For example, effecting a series connection with the positive terminal of the ignition coil in a vehicle engine's ignition system, with R5's + (positive) output terminal shown in FIG. 3B, and which is accessed through terminal 8 on the ten terminal connector block shown in FIG. 2–2 will cause ignition failure when said relay - R5 is not energized, because this relay's open contact must close to complete the output circuit. It will be seen that any other electrical circuit which is, or has been made essential to a vehicle engine's operation, and which likewise is connected thereto, will be readily rendered functional or nonfunctional by respectively energizing or deenergizing relay DPDT - R5.

As mentioned earlier timer 1 may be triggered manually by depressing push button switch 16 on the keypad. It may also be triggered automatically when any door of the vehicle is opened, provided the already installed negative biased standard door switch circuit is are hooked into the system via the assigned terminal on the ten terminal block, FIG. 2—2.

Since the engine shut down function and associated actuating of the audible and light signaling alarm circuits initiated through timer 1, take place after the drop out of the timer in a predetermined time following the trigger pulse, it will be seen that the engine shut down and audible alarm functions will be impeded by continuously depressing keypad switch 16, or holding one of the vehicle's doors partially open thereby preventing the timer from switching off.

Such attempt is forestalled by relay SPDT - R3, which is wired in the trigger circuit of timer 1 as a self holding relay, that is, as the relay is energized by the trigger voltage along with the timer, the relay will continue to hold in itself even though the trigger voltage has ceased. This is achieved by connecting a line of the same polarity to the coil of the relay via its normally open contact, FIG. 3D. One side of its coil is connected to the output of timer 1, FIG. 3B, therefore, it will drop out when the timer output switches off.

The trigger supply passes through a pair of normally closed contacts on relay R3 before being connected to the trigger terminal (pin 2) of timer 1. FIG. 3B. Both R3 and timer 1 are actuated at the same time by the trigger pulse, but the pulling in of R3 opening its closed contacts isolates the trigger line from pin 2 of timer 1, so that continuous trigger current would have no effect on the timer after it has been actuated. After the timer has switched off, relay R3 drops out setting the timer ready to be triggered again.

Slave relay DPDT - R5 is wired as a self holding relay in a manner similar to that described for relay - R3 above. Its holding circuit is controlled by relay SPDT - R4.

R4 is connected across the negative line of the power supply and the positive terminal of capacitor CS, FIG. 3D. The holding circuit of relay - R5 passes through R4's closed contacts, and would, therefore, be interrupted whenever relay - R4 is energized by discharge current from the capacitor and pulls in opening its contacts. This will cause relay - R5 to drop out returning its normally open contact to the open position, thereby interrupting the ignition coil circuit and consequently shutting down the engine as mentioned in an earlier paragraph where the holding circuit of R5 is not taken into consideration.

Slave relay - R5 once energized by punching in the combination code on the keypad, holds itself in the energized position and in the absence of being turned off by the shut down function of timer 1, which causes relay - R4 to pull in breaking R5'S holding circuit, can only be turned off by the ignition switch.

This self holding feature of - R5 after being energized, permits engine operation independent of the electronic antitheft system which is restricted to engine start up only. The self holding circuit of the said relay - R5, connects its coil directly across the power supply through one of its normally open contacts which is connected in series with the ignition switch, FIGS. 3B & 3D. When the relay is momentarily energized, thereby closing the said open contact, continuous current is supplied to the coil preventing it from dropping out even though the triggering current ceases. The direct connection to the power supply through this means must be interrupted, in the manner described in the preceding paragraph, in order to cause relay - R5 to drop out.

The power supply which comes from the vehicle's battery, is connected to the theft prevention device through its ten terminal connector block FIG. 2—2, on the main enclosure located under the hood of the vehicle. The main control relay, slave relay - R5, which operates to close or open an essential circuit, such as the ignition circuit, in the vehicle engine's electrical or electronic wiring, (permitting start up or causing shut down of the vehicle's engine) when energized causes its coil to be connected across the power supply independent of the keypad, in which the said keypad if disconnected from the main enclosure, would have no effect on the operation of the said relay - R5. Similarly, relay - R4, of which a closed contact thereon is connected in series with the holding circuit of relay - R5, is energized by the discharge voltage output of capacitor CS, FIG. 3d. The charge and discharge state of said capacitor is controlled by relay - R1, which in turn, is triggered only by depressing the pushbutton of an assigned switch on the keypad, that directly causes relay - R4 to be energized, or which triggers timer 1 into giving a voltage output that energizes the said relay - R4. Here also disconnecting the keypad from the main enclosure will have no effect on the operation of relay -R4 as well as relay -R5.

Relay SPDT - R6 is energized by depressing any one of three pushbutton switches on the keypad, FIG. 1, that is hooked up to the negative side of the power supply, and have a common load line that is connected to one side of the coil of R6, FIG. 3D. The other side of the coil is connected to the positive side of the power supply. A positive line passes through the open contacts of this relay and is connected to the positive point on the coil of SCR driver relay DPDT - R2, FIG. 3D.

Three other pushbutton switches of the keypad are hooked up to the positive side of the power supply and their load sides are connected by means of a single conductor to the same positive point on the coil of relay - R2. It is clear then that if any one of these six pushbutton switches is depressed it will cause relay R2 to pull in and switch off the SCR'S causing the engine to shut down, and the associated alarm circuits to activate.

Making the line side of three switches negative and the line side of the other three switches positive, prevents successful keypad tampering or bridging of the wires in an attempt to start the engine outside of the combination code. In the event two or three correct pushbuttons or conductors are selected, depressing a wrong switch or bridging a wrong wire will annul the correct ones. For the purpose of illustration only, the negative switches are shown in FIG. 3A as nos. 5, 6, & 13 and the positive ones as 2, 9, 15.

Relay SPDT - R7, FIG. 3D, is connected across the negative power supply line and the positive output terminal (pin 3) of timer 2, FIG. 3B. Its function is to actuate the audible alarm circuit which is an external circuit that includes a device that emits a sound in the audible frequency range, in response to electrical energy applied thereto and, which passes through the alarm circuits key switch which has both bistable and momentary contacts, FIG. 3D and is connected to the theft prevention system at the ten terminal connector block, FIG. 2.2 when unauthorized interference of the vehicle occurs while it is left parked and unattended. This relay is energized by the output of timer 2 when it switches on. Timer 2 may be triggered by the normally closed door switches which come with the vehicle, if said door switches are connected thereto, or by one shot touch switches, vibration sensor, motion detector, photo cell, etc. installed on the vehicle for this purpose.

Timer 2 is also triggered by a negative normally open contact on relay R2 whenever this relay is energized by discharge current from capacitor CS, closing its contact and grounding the trigger terminal of the said timer 2, FIG. 3D, which serves to lock the audible alarm circuit in the activated position after it has been triggered by timer 1. This ensures that the alarm will at least sound for a minimum time duration equal to that of timer 2, in the unlikely event any attempt made to silence the alarm, by shorting or bridging the ribbon cable conductors which include the switch leg to timer 1, is successful. In accordance with the present design whenever the audible alarm is actuated as a result of the shut down function of timer 1, through capacitor CS, it will begin sounding simultaneously with the shut down of the engine in the motor vehicle, and continue sounding, until turned off by entering the start up code through the keypad.

Unlike timer 1 which is connected to the power supply through the ignition switch, FIG. 3B, timer 2 which controls parked intrusion response is connected directly across the supply lines, and is in the armed position at all times.

Referring to FIG. 3C, SCR 9 controls the hood lock which is an integral part of the system preventing attempt to circumvent the antitheft system and is connected thereto through the ten terminal connector block. The hood lock is activated by punching in the engine start up combination code except for the last number which is substituted by a number especially assigned to the hood lock function. It will be seen, therefore, that when the engine is in the run position, a single pushbutton on the keypad will actuate the hood lock.

The hood lock solenoid is connected to the negative terminal of the vehicle's battery through SCR 9, and to the positive terminal through the combination setting series SCR circuits, at switch SPDT, FIG. 3C. When the assigned SCR series string coupled with the said SPDT switch—which is mounted on the main enclosure—is triggered into conduction to provide positive polarity from the power supply to terminal 8 of the ten terminal connector block for one side of the coil of relay DPDT - R5, it also provides positive polarity at one of the terminals of the two terminal connector block also mounted on the main enclosure and which is connected in parallel with terminal 8 of the ten terminal connector block. One side of the hood lock solenoid coil is connected to this positive terminal of the two terminal connector block. The other side of the solenoid coil is connected to the negative polarity of the power supply through SCR 9, which must first be triggered into conduction, by depressing the assigned key on the keypad, in order to energize the hood lock solenoid. IT will be seen that when the said vehicle's engine is running the hood lock can be caused to open through the use of a single button on the keypad. When the said engine is not running, the pushbutton switches on the keypad that trigger SCR conduction to provide positive polarity for engine start-up, as well as the pushbutton switch on the said keypad that controls the independent negative polarity hood lock SCR, shown in FIG. 3C as SCR 9, will have to be depressed in proper sequence to operate the hood lock. SPST toggle switch HLE and momentary contact switch PBE, FIG. 3C, are two emergency switches installed at any desired place on the vehicle, which also connect the hood lock solenoid across the battery supply, for the purpose of providing a secret means of opening the hood in the event the keypad is unavailable for one reason or another. When the toggle switch hooked up to the negative line of the power supply is in the on position, pressing the button of the positive connected momentary switch will energize the hood lock solenoid, thereby releasing the lock jam and unlocking the hood. Relay R11, FIG. 3D, is also connected in parallel with the hood lock solenoid to secret switch PBE and is energized simultaneously with the said solenoid, opening its closed contacts to cause the continuous audible alarm triggered by timer 1 and which passes through the closed contacts of R5 to turn off. Both the solenoid and relay R11 will be deenergized when the pushbutton momentary switch is released. These two switches HLE and PBE have a dual function, together in the on position they energize the hood lock solenoid to effect the opening of the hood, as well as turn off the sounding of the continuous alarm triggered by timer 1, without the aid of the keypad code.

Relay DPDT - R8 in conjunction with relay SPDT - R9, FIG. 3D, provide for the intentional bypassing of the system when necessary so as to avoid divulging the keypad code.

Relay R8 is connected in parallel across the same lines with the hood lock solenoid, FIG. 3C & FIG. 3D, and, therefore, each of these two devices are actuated simultaneously, that is, whenever the hood lock solenoid is activated, so too, is relay - R8. Once energized R8 will hold itself in due to jumper wires between its coil and the supply lines at the load side of its normally open contacts, FIG. 3D. Punching in the start up combination code—which as mentioned earlier is the same code as the hood lock / relay - R8 code minus one code number that is substituted by an assigned hood lock number—energizes relay R5 which causes relay R8 to drop out.

Relay R9 is connected to the positive line of the power supply via the ignition switch, and to the negative line through a pair of normally open contacts on relay R8, which in turn is fed through a pair of normally closed contacts on relay R5, FIG. 3D. Obviously, relay R9 cannot be energized if relay R5 is pulled in or conversely if relay R8 is not pulled in.

When relay R8 is activated and pulls in closing its open contacts, one side of the coil of R9 will be connected to the negative line provided relay R5 is not energized maintaining its normally closed contacts. It is clear then that when the ignition switch is turned on relay R9 will be energized. When energized R9 will close its normally open contacts providing a positive feed from the ignition switch to the immobilizing means selected in the system, thereby bypassing the need to energize slave relay R5 to achieve engine start up. This feature will also be found desirable when mechanical or other repair work is to be carried out on the vehicle. It will be seen that another pair of normally closed contacts on relay R5 must be closed in order to accomplish this, and that an opposite pair of normally open contacts on R5 provides the same function when R5 is energized. A jumper wire across terminals 7 & 8 on the ten terminal connector block, FIG. 2—2, provides for bypassing the system for an indefinite period of time.

Relay SPDT - R10 actuates the emergency light flashing visual warning circuit, which is an external circuit that includes a set of intermittent flash lamps that may include the vehicle's factory installed hazard lights, whenever the engine shut down function is actuated or when unauthorized interference occurs while the vehicle is unattended. It is hooked up across the negative supply line and the positive output terminal of timer 1, FIGS. 3B & 3D. Unlike relay R7 that controls the audible alarm circuit, relay R10 is wired to hold itself in after being energized to provide continuous functioning of the visual circuit until it is turned off manually. The holding circuit passes through a normally closed momentary contact of the keyed alarm circuits switch, shown in FIG. 3D as the alarm sound/light key switch, by which it may be turned off.

Thermistor TD in the coil circuit of relay R10, FIG. 3D, delays said energizing of the relay for a predetermined time set midway between the time it will take from the triggering of timer 1 to the shut down of the engine when this circuit is activated. Whereas the audible alarm in activated through capacitor CS, the emergency light flashing alarm is triggered directly by output from timer 1.

This feature provides for ample warning to other users of the road well ahead of actual vehicle shut down, as well as, the person behind the driver's wheel with appropriate indicating accessory that the vehicle is about to shut down and that it should be pulled over to the side off the roadway. This time span along with the natural coasting of the vehicle due to momentum after engine shut down, provides ample time for safe parking in order to safely escape as would naturally be desired by a would-be perpetrator.

As mentioned earlier, during actuation of the shut down circuits relay - R2 is momentarily energized due to capacitor discharge current from capacitor CS, FIG. 3D, triggering timer 2 which controls the length of time that the audible alarm will sound. It also triggers SCR 8 to conduct supplying current for continuous audible alarm when actuated by the shut down function of relay - R2, FIGS. 3C & 3D.

The cathode of SCR 8 is connected to the negative supply line and is shown taken off a closed contact on relay R5 through which it may be switched off when R5 pulls in; output at its anode is connected to the audible alarm device, FIG. 3C. Connection to the alarm device is made at terminal 2 of the ten terminal connector block, FIG. 2—2.

Referring to the control module in FIG. 2, two open contact mercury bulb type switches, as shown in FIG. 3B–3, diametrically set at 45 degree angles are therein connected across the trigger terminals (pins 1 & 2) of timer 2, FIG. 3B, and will trigger the timer causing it to actuate the alarm circuits whenever the vehicle is raised either from the front or the back for unauthorized towing away. This is achieved by the conductive mercury bridging the open contacts contained in the class bulb as it tilts when the vehicle is raised. The single pole single throw, SPST, toggle switch in FIG. 3B–3 allows the mercury tilt switches to be switched off if the vehicle is to be parked on an incline such that will cause them to trigger the timer and its alarm circuits when not desired.

Relay DPDT - R11 is energized by depressing one of the pushbutton switches on the keypad to which it is connected. The purpose of R11 is to allow bypassing of the door triggering of timer 1, when it is desired to exit the vehicle while leaving the engine running without actuating the shut down function, as well as resetting the trigger function on closing the door after exiting. To accomplish this R11 is connected across the negative line of the power supply via the circuit of the standard door switches installed on motor vehicles, FIG. 3D, and to the positive line via the selected normally open pushbutton switch on the keypad in FIG. 1, and which is shown in FIGS. 3C & 3D as pushbutton switch 11.

Partially opening a door releasing the door switch causing it to close its contacts and then depressing the pushbutton switch on the keypad, will cause relay R11 to pull in and hold in due to a jumper wire across its coil and the positive supply line on the load side of one of its normally open contacts. The positive line to timer 1 passes through the closed contacts of R11, FIG. 3D, so that when this relay is pulled in opening its closed contacts timer 1 cannot function. Closing the door opens the closed contacts of the door switch, and causes relay R11 to drop out closing its open contacts thereby completing the circuit of timer 1.

It is obvious that if the door is again opened timer 1 will be triggered and the shut down function will be actuated, except again being deliberately bypassed by depressing the said keypad switch while the door is still open and then closing it completely.

The entire antitheft system is powered by the battery of the vehicle and connected thereto through the ten terminal connector block on the control module. Nevertheless the system has its own power source, a small lead acid battery measuring about 4.5 ins. ×2.5 ins. ×4 ins., FIG. 4B–1, hooked up in parallel with that of the vehicle, FIG. 4A–1. This auxiliary battery is used primarily to provide a holding voltage across the system's electronic circuits which will cease to function when starting the engine by turning the ignition switch, due to the high voltage drop across the starter circuit.

Diode DB FIG. 4B–2, prevents current flowing into the starter circuit from the auxiliary battery, but allows the current that charges the vehicle's battery to also keep the auxiliary battery in a good state of charge.

What is claimed is:

1. An automobile theft prevention and protection device having circuit means disposed to control the shutting down of the running engine of an automobile, said engine having an electrical system for providing power thereto, said circuit means comprising:

indicating means including a visible alarm and an audible alarm;

sequence select and latching means;

a bistable power output switching means;

a switch control circuit means which is coupled to said bistable power output switching means for controlling the switching of said switching means;

a continuous alert means including circuitry which is coupled so as to condition said sequence select and latch means for providing a selective response to the visible and audible alarms so as to provide an indication as to the status of the engine of the automobile;

a reinstating means including a codified voltage impulse device which is coupled to the continuous alert means so as to reset the status of the response indication of the engine;

a triggering means including a door switch of the automobile, said triggering means controlling actuation of the switch control circuit means;

first and second DC power supply means, wherein said first DC power supply means is a low current twelve volt DC battery, and said second DC power supply means is a standard twelve volt DC battery, both power supply means being included in the bistable power output switching means and electrically connected to said bistable power output switching means so as to deliver electrical power to said switching means in one of a singular or collective manner;

said switching means being coupled with the electrical system of said engine and having first and second operating states for powering the electrical system of the engine, said states being determined in response to an input signal from said triggering means and as well said states being controlled by said codified voltage impulse device such that in a first state, electrical voltage, which is derived from said low current twelve volt DC battery, is switched from said engine electrical system to the shut down indicating means, causing the engine to shut down, and in a second state, electric voltage, which is derived simultaneously from the low current DC battery and the standard twelve volt DC battery is switched from the shut down indicating means to the engine electrical system thereby causing an active condition in the engine which provides power to the engine and enables the automobile engine to run.

2. An automobile theft prevention and protection device as set forth in claim 1, wherein said bistable power output switching means includes an electrically controllable device which is mounted in a protective structure, such that energization of said bistable power switching means is controlled by an integrated switching system that includes a plurality of silicon controlled rectifiers conditioned by a plurality of multipole switches and disposed for selective response to voltage input through said codified voltage impulse device such that a selected number of said silicon controlled rectifiers must be made electrically conductive in order for said switching means to be energized.

3. An automobile theft prevention and protection device as set forth in claim 2 above, and further including:

electrical terminal connectors in said protective structure of the switching means; and moving levers connected to the multipole switches which allow rearrangement of internal circuit wiring in terminals of the multipole switches, said terminals further being connected to said silicon controlled rectifiers so as to allow the electrical terminal connectors of the protective structure of the switching means to condition the shutting down of the engine of the automobile by rendering the engine inactive for an indefinite period of time as determined by the interconnection of the internal circuit wiring, which is in turn determined by the positions of the levers of the multipole switches.

4. An automobile theft prevention and protection device as set forth in claim 1, wherein said codified voltage impulse device includes a pulse key.

5. An automobile theft prevention and protection device as set forth in claim 1, wherein said sequence select and latch means and said bistable power output switching means are mutually electrically coupled with said reinstating means, said sequence select and latch means and said bistable power output switching means being disposed so as to be:
a) in a first instance alternately responsive, and
b) in a second instance simultaneously responsive to input from said reinstating means.

6. An automobile theft prevention and protection device having circuit means disposed to control the shutting down of the running engine of an automobile, said engine having an electrical system for providing power thereto, said circuit means comprising:

indicating circuit means including a visible alarm and an audible alarm;

sequence select and latch means;

a bistable power output switching means including first and second sets of fixed electrical contacts, and a set of movable electrical contacts disposed to communicate alternately with said first and second set of fixed electrical contacts, said second set of fixed electrical contacts being coupled with the electrical system of the engine;

switch control circuit means coupled with the bistable power output switching means for controlling the switching of the switching means;

a continuous alert means including circuitry which is coupled so as to condition a sequence select and latch means for providing a selective response to the visible and audible alarms so as to provide an indication as to the status of whether the engine of the automobile is at rest, whether the engine is running, and further whether the automobile is in motion;

a reinstating means including a codified voltage impulse device which is coupled to the continuous alert means so as to reset the status of the response indication of the engine;

a triggering means including a door switch of the automobile, said triggering means controlling actuation of the switch control circuit means;

first and second DC power supply means, wherein said first DC power supply means is a low current twelve volt DC battery, and said second DC power supply means is a standard twelve volt DC battery, both power supply means being included in the bistable power output switching means and electrically connected to said bistable power output switching means so as to deliver electrical power to said switching means in one of a singular or collective manner;

said switching means being coupled with the electrical system of said engine and having first and second operating states for powering the electrical system of the engine, said states being determined in response to an input signal from said triggering means and as well said states being controlled by said codified voltage impulse device such that in a first state, electrical voltage, which is derived from said low current twelve volt, is switched from said engine electrical system to the shut down indicating means and causing the engine to shut down, and in a second state, electric voltage, which is derived simultaneously from the low current DC battery and the standard twelve volt DC battery is switched from the shut down indicating means to the engine electrical system thereby causing an active condition in the engine which provides power to the engine and enables the automobile engine to run;

said triggering means when actuated causes said visible alarm to be activated so as to indicate shut down and thereby switching off of the engine electrical system by said bistable power output switching means and simultaneously activating the audible alarm and maintaining the alarm until reinstated by the reinstating means.

7. An automobile theft prevention and protection device as set forth in claim 6, wherein said sequence select and latch means further includes:

a discriminator system comprising:

a first timing device conditioning a capacitor to drive a second timing device modulated by an NTC thermistor, said first timing device and said second timing device being, in a first instance alternately coupled, and in a second instance simultaneously coupled to said triggering means, wherein said sequence select and latch means having been triggered by said triggering means is conditioned by the status of said engine for selective activation of said indicating circuit means including a visible alarm response in the form of intermittent flash lamps including a lamp to warn of impending engine shut down and;

said indicating means further including an audible alarm response in the form of a device that emits a sound in the audible frequency range;

said indicating circuit means having been activated, said sequence select and latch means overriding and excluding electrical and mechanical input to the circuit means from aborting the operation of said activated circuit means, thereby latching the activated circuit means into continuous response.

8. An automobile theft prevention and protection device as set forth in claim 6, wherein:

said bistable power output switching means includes movable contacts, said contacts being switched to communicate with said first set of fixed electrical contacts, thereby impressing thereon a positive electric charge for driving the engine electrical system;

said movable contacts being switched to communicate with said second set of fixed electrical contacts, thereby impressing thereon a positive electric charge for driving the indicating circuit means as well as conditioning said circuit means for driving said engine electrical system;

wherein said positive electric charge is opposite in polarity to the grounded negative charge terminal of the standard twelve volt DC battery of the automobile; and wherein said sequence select and latch means having been triggered by said triggering means, and said engine being in a state of rest, activates simultaneously a visible alarm response and an audible alarm response of said indicating means, and after a predetermined period of time switches off said audible alarm response while simultaneously latching said visible alarm response into continuous activation until manually switched off;

said sequence select and latch means, having been triggered by said triggering means and said engine being in a running state, activates said visible alarm, and after a predetermined period of time activates said bistable power output switching means to switch said movable electrical contacts from communicating with said second set of fixed electrical contacts, thereby repressing said electric charge from the contacts and consequently switching off battery power from the engine electrical system, which causes said engine to shut down; and said bistable power output switching means, having alternately switched said movable electrical contacts to communicate with the first set of fixed electrical contacts, thereby supplying battery power for activating the audible alarm response and latched on activation of said visible alarm response.

9. An automobile theft prevention and protection device as set forth in claim 6, further including:

a plurality of doors on the automobile, each door having door switches included in door switch circuits which indicate an open or closed status of the door, wherein said triggering means is automatically actuated by the opening of at least one door which causes a held open contact of one of said switches in the door switch circuit to close, thereby completing a trigger circuit of said triggering means so as to trigger said sequence select and latch means which sequentially activates a visible alarm response, thereby causing said bistable switching means to initiate engine shut down and activation of an audible alarm response.

10. An automobile theft prevention and protection device as set forth in claim 6, wherein said codified voltage impulse device of said reinstating means includes a pulse key electrically connected to circuitry of said reinstating means through which an electrical control signal is entered manually by depressing said pulse key, thereby triggering said sequence select and latch means which sequentially activates a visible alarm response via the switching of said bistable switching means which causes the engine to shut down, and as well causes the activation of an audible alarm response.

11. An automobile theft prevention and protection device as set forth in claim 8, wherein said visible alarm means having been activated by said sequence select and latch mean is locked in continuous activation until manually switched off, and said audible alarm response is activated simultaneously with said bistable switching means by said sequence select and latch means being locked in continuous activation until a coded signal is entered through said reinstating means.

12. An automobile theft prevention and protection device as set forth in claim 6, wherein said codified voltage impulse device of said reinstating means includes a plurality of pulse keys electrically connected to the circuitry of said reinstating means for inputting a codified control signal that conditions said bistable switching means and said reinstating means, wherein said reinstating means includes bypass means that further conditions said sequence select and latch means for bypassing response to said triggering means, thereby preventing said bistable switching means from activating, and consequently causing shut down of said engine of said automobile, said bypass means including one of said pulse keys of said reinstating means and circuitry manually activated from input through said pulse key, that controls the energizing of an electrical relay coupled with said triggering means, such that when said electrical relay is energized, there exists an electrically non-conductive state between said sequence select and latch means and said triggering means.

13. An automobile theft prevention and protection device as set forth in claim 12 and further including, a plurality of doors on the automobile, each door having door switch included in door switch circuits which indicate an open or closed status of the door, wherein:

said bypass pulse key, being momentarily pulsed prior to opening one of said doors of said automobile and then re-closing said door, as well as being momentarily pulsed after opening one of said doors of said automobile and then closing said door, will override said triggering means and prevent said sequence select and latch means from activating said bistable switching means, consequently circumventing said shut down of said engine of the automobile.

14. An automobile theft prevention and protection device as set forth in claim 12, wherein said reinstating means includes one of said pulse keys through which a coded signal is entered while the automobile engine is running such that the bistable switching means is responsive to input from said reinstating means, thereby setting a requirement for entry of a coded signal for all subsequent engine start up; and subsequently having effected start up through entry of said coded signal, entering a coded signal through said pulse key during the running of said engine such that said bistable switching means is nonresponsive to input from said reinstating means;

said pulse key having been pulsed, simultaneously activates the bistable switching means to control all subsequent engine start up without a requirement for entry of said coded signal.

* * * * *